US012158757B1

(12) United States Patent
Ebrahimi Afrouzi

(10) Patent No.: US 12,158,757 B1
(45) Date of Patent: *Dec. 3, 2024

(54) AUTONOMOUS REFUSE CONTAINER REPLACEMENT SYSTEM

(71) Applicant: Ali Ebrahimi Afrouzi, San Diego, CA (US)

(72) Inventor: Ali Ebrahimi Afrouzi, San Diego, CA (US)

(73) Assignee: AI Incorporated, Toronto (CA)

( * ) Notice: Subject to any disclaimer, the term of this patent is extended or adjusted under 35 U.S.C. 154(b) by 160 days.

This patent is subject to a terminal disclaimer.

(21) Appl. No.: 17/470,894

(22) Filed: Sep. 9, 2021

Related U.S. Application Data

(63) Continuation of application No. 16/245,998, filed on Jan. 11, 2019, now Pat. No. 11,144,056.

(60) Provisional application No. 62/616,669, filed on Jan. 12, 2018.

(51) Int. Cl.
*B65F 3/00* (2006.01)
*G05D 1/00* (2006.01)
*G08G 1/00* (2006.01)

(52) U.S. Cl.
CPC ............. *G05D 1/0088* (2013.01); *B65F 3/00* (2013.01); *G05D 1/0027* (2013.01); *G05D 1/0225* (2013.01); *G08G 1/205* (2013.01); *B65F 2210/128* (2013.01); *B65F 2210/182* (2013.01)

(58) Field of Classification Search
CPC ............................ G05D 1/0088; F05D 1/0027
See application file for complete search history.

(56) References Cited

U.S. PATENT DOCUMENTS

| | | | |
|---|---|---|---|
| 4,537,420 A | 8/1985 | Ito | |
| 5,565,846 A | 10/1996 | Geiszler | |
| 5,697,633 A | 12/1997 | Lee | |
| 5,924,712 A | 7/1999 | Pierce | |
| 5,995,884 A | 11/1999 | Allen | |
| 6,535,793 B2 | 3/2003 | Allard | |
| 6,667,592 B2 | 12/2003 | Jacobs | |
| 6,845,297 B2 | 1/2005 | Allard | |
| 7,568,536 B2 | 8/2009 | Yu | |

(Continued)

FOREIGN PATENT DOCUMENTS

| | | |
|---|---|---|
| CN | 104944029 B | 6/2017 |
| JP | 4556024 B2 | 10/2010 |

*Primary Examiner* — Jess Whittington

(57) ABSTRACT

Provided is a robotic refuse container system, including: a first robotic refuse container, including: a chassis; a set of wheels; a rechargeable battery; a processor; a refuse container; a plurality of sensors; and a medium storing instructions that when executed by the processor effectuates operations including: collecting sensor data; determining a movement path of the first robotic refuse container from a first location to a second location; and pairing the first robotic refuse container with an application of a communication device; and the application of the communication device, configured to: receive at least one input designating at least a schedule, an instruction to navigate the first robotic refuse container to a particular location, and a second movement path of the first robotic refuse container; and display a status; wherein the first robotic refuse container remains parked at the first location until receiving an instruction to execute a particular action.

20 Claims, 3 Drawing Sheets

(56) References Cited

U.S. PATENT DOCUMENTS

| | | | |
|---|---|---|---|
| 7,813,835 B2 | 10/2010 | Fujita | |
| 8,355,828 B2 | 1/2013 | Tolia | |
| 8,380,349 B1 | 2/2013 | Hickman | |
| 8,458,715 B1 * | 6/2013 | Khosla | G06F 9/50 |
| | | | 718/104 |
| 9,168,786 B2 | 10/2015 | Schlee | |
| 9,283,674 B2 | 3/2016 | Hoffman | |
| 9,298,183 B2 | 3/2016 | Artes | |
| 9,486,924 B2 | 11/2016 | Dubrovsky | |
| 9,821,455 B1 * | 11/2017 | Bareddy | G06Q 10/06 |
| 10,102,586 B1 * | 10/2018 | Marlow | B64C 39/024 |
| 10,596,695 B1 * | 3/2020 | Bareddy | B25J 9/0084 |
| 10,678,254 B1 * | 6/2020 | Jonas | A47L 9/2894 |
| 2009/0248200 A1 | 10/2009 | Root | |
| 2016/0012411 A1 * | 1/2016 | Kursun | G07F 19/205 |
| | | | 705/42 |
| 2017/0123418 A1 * | 5/2017 | Erickson | G08G 5/0082 |
| 2017/0285642 A1 * | 10/2017 | Rander | B60H 1/00357 |
| 2017/0293301 A1 * | 10/2017 | Myslinski | G06Q 10/0833 |
| 2018/0164828 A1 * | 6/2018 | Dumitras | G01G 19/52 |
| 2018/0307779 A1 * | 10/2018 | Tellex | G06N 3/045 |
| 2019/0047698 A1 * | 2/2019 | Jassowski | G05D 1/104 |
| 2019/0092183 A1 * | 3/2019 | Sussman | G05D 1/0088 |

* cited by examiner

AUTONOMOUS REFUSE CONTAINER REPLACEMENT SYSTEM

CROSS-REFERENCE TO RELATED APPLICATIONS

This application is Continuation of U.S. Non-Provisional patent application Ser. No. 16/245,998, filed Jan. 11, 2019, which claims the benefit of U.S. Provisional Patent Application No. 62/616,669, filed Jan. 12, 2018, each of which is hereby incorporated by reference.

In this patent, certain U.S. patents, U.S. patent applications, or other materials (e.g., articles) have been incorporated by reference. Specifically, U.S. application Ser. Nos. 15/272,752, 15/949,708, 16/048,179, 16/048,185, 16/163,541, 16/163,562, 16/163,508, 16/185,000, 62/681,965, 62/614,449, Ser. Nos. 16/109,617, 16/051,328, 15/449,660, 16/041,286, 15/406,890, 14/673,633, 16/163,530, 62/746,688, 62/740,573, 62/740,580, Ser. Nos. 15/955,480, 15/425,130, 15/955,344, 15/048,827, 14/817,952, 16/198,393, 15/981,643, 15/986,670, 62/664,389, 15/447,450, 15/447,623, 62/665,942, 62/617,589, 62/620,352, Ser. Nos. 15/951,096, 16/130,880, 14/948,620, 16/239,410, 14/859,748, 16/230,805, and 16/129,757, are hereby incorporated by reference. The text of such U.S. Patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

This disclosure relates to mobile robotic devices and more particularly to mobile robotic refuse containers.

BACKGROUND

Autonomous robotic devices are becoming increasingly common in consumer homes and commercial spaces. In several instances, autonomous robotic devices are desirable for the convenience they provide to a user. For example, autonomous mobile robotic devices may be used for cleaning homes, waste management, industrial tasks and the like. As the technology progresses, autonomous robotic devices may be implemented on a larger scale. For example, a network of robotic devices may be implemented within an environment to collaboratively execute tasks.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects provide is a robotic refuse container system, including: a first robotic refuse container, comprising: a chassis; a set of wheels; a rechargeable battery; a processor; a refuse container coupled to the chassis; a plurality of sensors; and a tangible, non-transitory, machine-readable medium storing instructions that when executed by the processor effectuates operations including: collecting, by the plurality of sensors, sensor data; determining, by the processor, a movement path of the first robotic refuse container from a first location to a second location; and pairing, by the processor, the first robotic refuse container with an application of a communication device; and the application of the communication device, configured to: receive at least one input designating at least a schedule of the first robotic refuse container, an instruction to navigate the first robotic refuse container to a particular location, and a second movement path of the first robotic refuse container from a third location to a fourth location; and display a status of the first robotic refuse container; wherein the first robotic refuse container remains parked at the first location until receiving an instruction to execute a particular action.

Some aspects include a method for managing an autonomous robotic refuse container system including: collecting, by a plurality of sensors disposed on a first robotic refuse container, sensor data; determining, by a processor of the first robotic refuse container, a movement path of the first robotic refuse container from a first location to a second location; pairing, by the processor of the first robotic refuse container, the first robotic device with an application of a communication device; receiving, by the application, at least one input designating at least a schedule of the first robotic refuse container, an instruction to navigate the first robotic refuse container to a particular location, and a second movement path of the first robotic refuse container from a third location to a fourth location; and displaying, by the application, a status of the first robotic refuse container; wherein the first robotic refuse container remains parked at the first location until receiving an instruction to execute a particular action.

DETAILED DESCRIPTION OF SOME EMBODIMENTS

Figure 1:
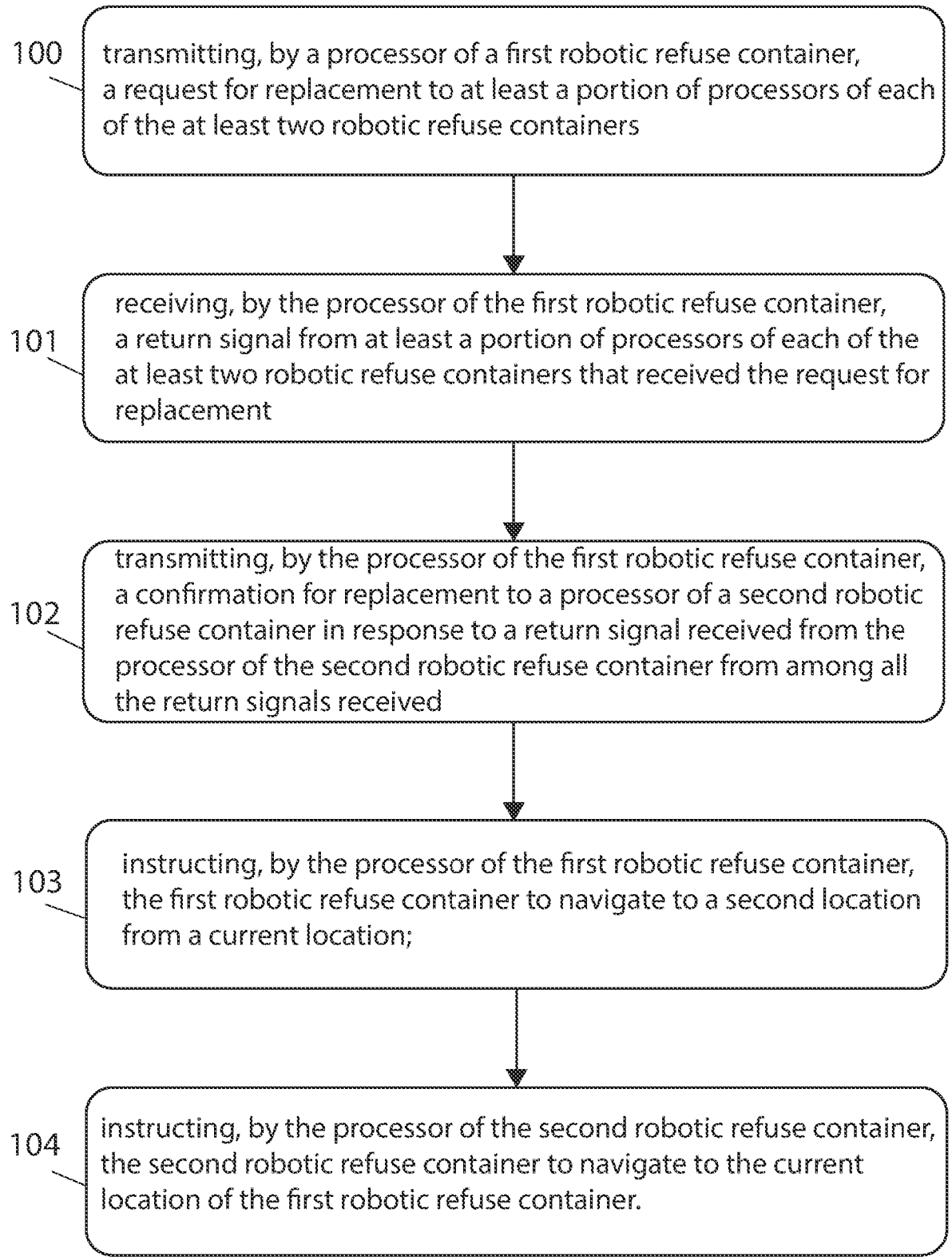
FIG. 1 illustrates a flow chart describing a method for autonomous refuse container replacement according to some embodiments.

The present inventions will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments include an autonomous robotic refuse container replacement system for at least two robotic refuse containers including: transmitting, by a processor of a first robotic refuse container, a request for replacement to at least a portion of processors of each of the at least two robotic refuse containers; receiving, by the processor of the first robotic refuse container, a return signal from at least a portion of processors of each of the at least two robotic refuse containers that received the request for replacement; transmitting, by the processor of the first robotic refuse container, a confirmation for replacement to a processor of a second robotic refuse container in response to the return signal received from the processor of the second robotic refuse container; instructing, by the processor of the first robotic refuse container, the first robotic refuse container to navigate to a second location from a current location; and instructing, by the processor of the second robotic refuse container, the second robotic refuse container to navigate to the current location of the first robotic refuse container. In some embodiments, the first robotic refuse container requests replacement because a battery of the first robotic refuse container requires recharging, the refuse container is close to being full or is full, or the first robotic refuse container is malfunctioning. In some embodiments, the processors of each of the at least two robotic refuse containers that receive the request for replacement are currently empty, unused, and charged. In some embodiments, the processors of each of the at least two robotic refuse containers that receive the request for replacement have a fill volume below a predetermined threshold, are charged to a level above a predetermined threshold, and are unused. In some embodiments, the processors of each of the at least two robotic refuse containers that transmit the return signal in response to a request for replacement are currently empty, unused, and charged. In some embodiments, the processors of each of the at least two robotic refuse containers that transmit the return signal in response to a request for replacement have a refuse fill volume below a predetermined threshold, are charged to a level above a predetermined threshold, and are unused. In some embodiments, the processor of the second robotic refuse container that receives the confirmation for replacement is the nearest, unused, and charged robotic refuse container. In some embodiments, the processor of the first robotic refuse container determines which processor to transmit the confirmation signal to based on location, fill volume and battery charge of each of the robotic refuse containers from which the return signal was received and the current location of the first robotic refuse container, wherein different factors can have different weight depending on importance. In some embodiments, the processor of the first robotic refuse container transmits the request for replacement to processors of the at least two robotic refuse containers that are located within a first predetermined distance from the first robotic refuse container, have a refuse fill volume below a predetermined threshold, have a battery level above a predetermined threshold, and are unused. In some embodiments, the processor of the first robotic device increases the first predetermined distance to a second predetermined distance when there are no unused robotic refuse containers with a refuse fill volume below a predetermined threshold and a battery level above a predetermined threshold within the first predetermined distance. In some embodiments, the second location of the first robotic refuse container is the nearest charging station, the nearest refuse collection site, the nearest parking area, a designated charging station, a designated refuse collection site, or a designated parking area.

In some embodiments, the processor of the at least two robotic refuse containers communicate and collaborate with one another using collaborative methods for robotic devices, such as those described in U.S. patent application Ser. Nos. 15/981,643, 15/986,670, 16/185,000, 15/048,827 and 14/948,620, the entire contents of which are hereby incorporated by reference. In some embodiments, the processors of the at least two robotic refuse containers share intelligence and collaborate to determine which robotic refuse container of each of the robotic refuse containers from which the return signal was received should replace the first robotic refuse container that transmitted the request for replacement. In some embodiments, the processors of the at least two robotic refuse containers share intelligence and the processor of the first robotic refuse container determines which robotic refuse container of each of the robotic refuse containers from which the return signal was received should replace it based on the intelligence shared between the at least two robotic refuse containers, including location of robotic refuse containers (e.g., to determine nearest robotic refuse container), fill volume of robotic refuse containers, battery charge of robotic refuse containers, etc. In some embodiments, the processor of the first robotic refuse container determines which robotic refuse container of each of the robotic refuse containers from which the return signal was received should replace it using a Markov Decision Process (MDP), wherein the action or actions that provide the greatest overall reward for the at least two robotic refuse containers are chosen. Examples describing the implementation of a MDP for collaborating robotic devices are provided in U.S. patent application Ser. Nos. 15/981,643, 16/185,000, 16/230,805, 14/817,952, and 16/198,393 the entire contents of which are hereby incorporated by reference.

In some embodiments, a control system manages the autonomous robotic refuse container system. An example of a control system for managing robotic devices is described in U.S. patent application Ser. No. 16/130,880, the entire contents of which is hereby incorporated by reference. In some embodiments, the at least two robotic refuse containers are paired with the control system using a pairing method such as that described in U.S. patent application Ser. No. 16/109,617, the entire contents of which is hereby incorporated by reference. In some embodiments, the control system includes, a centralized server, a specialized computing device, an application (mobile or web for example) accessible from a communication device such as a mobile phone, tablet, laptop, etc., or another type of device. In some embodiments, the control system is autonomous, semi-autonomous, or manually operated. In some embodiments, the at least two robotic refuse containers communicate information with the control system, such as, a current volume of refuse, a maximum volume of refuse, a battery level, a current location, etc. and the control system instructs the at least two robotic refuse containers based on the information from the at least two robotic refuse containers communicated with the control system. In some embodiments, the control system receives a request for replacement from a processor of a first robotic refuse container. In some embodiments, the control system transmits instructions to a processor of a second robotic refuse container to navigate to a current location of the first robotic refuse container and instructions to the processor of the first robotic refuse container to navigate to a particular location. In some embodiments, the processor of the first robotic refuse container transmits the request for replacement because its refuse container is close to or is full, its battery level is low, or it is malfunctioning. In some embodiments, the control system determines the second robotic refuse container to replace the first robotic refuse container based on location of robotic refuse containers (e.g., to determine nearest robotic refuse container), fill volume of robotic refuse containers, battery charge of robotic refuse containers, etc. In some embodiments, the control system transmits information including the location of the first robotic refuse container and the route to navigate to the location of the first robotic refuse container to the processor of the second robotic refuse container. In some embodiments, the control system transmits information including the closest location to recharge a battery, the closest refuse collection location, and a navigational route to the processor of the first robotic refuse container.

In some embodiments, additional factors are used in determining the second robotic refuse container to replace the first robotic refuse container, including an activity level surrounding each of the at least two robotic refuse containers, a number of operation hours of each of the at least two robotic refuse containers, a condition of each of the at least two robotic refuse containers, a status of each of the at least two robotic refuse containers, a number of maintenance hours of each of the at least two robotic refuse containers, a time required for replacement of the first robotic refuse container, environmental conditions (e.g., traffic conditions, weather conditions, etc.), historical success in completing actions for each of the at least two robotic refuse containers, actions executed by each of the at least two robotic refuse containers, upcoming actions of each of the at least two robotic refuse containers, sensor data collected by each of the at least two robotic refuse containers, etc.

In embodiments, a graphical user interface of an application of a communication device is used to communicate with one or more robotic refuse containers or a control system of one or more robotic refuse containers. An example of a communication device includes, a mobile phone, a laptop, a tablet, a desktop computer, a remote control, and the like. An example of a graphical user interface is described in U.S. patent application Ser. Nos. 15/272,752 and 15/949,708, the entire contents of which are hereby incorporated by reference. In some embodiments, the application of the communication device is paired with one or more robotic refuse containers or a control system of one or more robotic refuse containers using pairing methods such as those described in U.S. patent application Ser. No. 16/109,617, the entire contents of which is hereby incorporated by reference. Information communicated between the application of the communication device and the one or more robotic refuse containers or the control system of one or more robotic refuse containers can include, but is not limited to, request for replacement of a particular robotic refuse container, fill level of a particular robotic refuse container, battery level of a particular robotic refuse container, request of a robotic refuse container at a particular location, etc. In some embodiments, a user communicates with the control system in real time using the application of the communication device, and the control system provides instructions to the one or more robotic refuse containers (as described above) based on the information communicated from the application. In some embodiments, the control system determines which robotic refuse container to transmit instructions to depending on, for example, the location, availability, battery level, etc. of the one or more robotic refuse containers and the instruction requested by the user.

In some embodiments, a processor of each robotic refuse container determines decisions, processes, execution of tasks individually based on, for example, internal and/or external observations, information received from the control system and/or other robotic devices, historical information, etc. In some embodiments, the processor of each robotic refuse container uses machine learning techniques to independently determine optimal actions to execute. Examples of learning techniques that can be applied are described in U.S. patent application Ser. Nos. 16/230,805, 14/859,748, 16/239,410, 16/041,286, and 16/198,393, the entire contents of which are hereby incorporated by reference. In some embodiments, the control system determines decisions, processes, execution of tasks for individual robotic refuse containers to which it is connected to.

In some embodiments, the processors of the at least two robotic refuse containers collaborate to or individually generate a map of the environment or individually generate. In some embodiments, a map of the environment is preloaded into a memory of each of the at least two robotic refuse containers. In some embodiments, the processors of the at least two robotic refuse containers generate a new map of the environment during each working session and combine it with previously generated maps to improve the accuracy of a complete map of the environment. In some embodiments, the processors of the at least two robotic refuse containers transmit one or more maps to a control system, such as the control system described above. In some embodiments, the control system updates a complete map of the environment with the maps received from the processors of the at least two robotic refuse containers. In some embodiments, the processors of the at least two robotic refuse containers transmit observations of the environment collected during working sessions. In some embodiments, the control system generates and updates a map of the environment using the observations received from the processors of the at least two robotic refuse containers. Examples of mapping methods are described in U.S. patents application Ser. Nos. 16/048,179, 16/048,185, 16/163,541, 16/163,562, 16/163,508, 16/185,000, 62/681,965, and 62/614,449, the entire contents of which are hereby incorporated by reference.

In some embodiments, each of the at least two robotic refuse containers autonomously park in a designated parking area when unused. An example of a method for autonomous parking of robotic devices is described in U.S. patent application Ser. No. 16/230,805, the entire contents of which is hereby incorporated by reference. In some embodiments, the at least two robotic refusers containers are operated using the autonomous vehicle system and methods described in U.S. patent application Ser. No. 16/230,805, the entire contents of which are hereby incorporated by reference. In some embodiments, each of the at least two robotic refuse containers or a control system managing the at least two robotic refuse containers autonomously adjust their operational settings or choose their actions based on environmental characteristics observed using methods such as those described in U.S. patent application Ser. Nos. 16/239,410 and 16/163,530, the entire contents of which are hereby incorporated by reference.

In embodiments, all or a portion of information transmitted by the processors of the at least two robotic refuse containers or a control system managing the robotic refuse containers is stored in a centralized memory that can be accessed by the processors of the at least two robotic refuse containers or the control system managing the robotic refuse containers. In some embodiments, information transmitted from the application of the communication device is stored in a centralized memory that can be accessed by the processors of the at least two robotic refuse containers or the control system managing the robotic refuse containers. In some embodiments, the information transmitted and received between the control system, the at least two robotic refuse containers, and the application of the communication device include several different types of information, such as scheduling information, mapping information, navigation information, task information, status information, internal or external observations, and other types of information that are useful to the control system, the at least two robotic devices, and a user of the application of the communication device.

In some embodiments, information is transmitted between devices (e.g., control system, robotic refuse container, communication device, etc.) using a wireless communication channel such as Wi-Fi or Bluetooth.

In some embodiments, a schedule for replacement for each or a portion of the at least two robotic refuse containers is determined by the processors of each or the portion of the at least two robotic refuse containers or a control system managing the at least two robotic refuse containers. In some embodiments, a schedule of a robotic refuse container includes a day and time for replacement, a particular robotic refuse container that will replace the robotic refuse container, a navigational route to a particular location after replacement, etc. In some embodiments, the schedule of the robotic refuse container includes day and time for replacement and the particular robotic refuse container that will replace the robotic refuse container, the navigational route to a particular location after replacement, etc. are determined in real-time at the time of replacement. In some embodiments, the schedule of each or the portion of robotic refuse containers is determined based on an activity level surrounding each of the at least two robotic refuse containers, a number of operation hours of each of the at least two robotic refuse containers, a condition of each of the at least two robotic refuse containers, a status of each of the at least two robotic refuse containers, a number of maintenance hours of each of the at least two robotic refuse containers, environmental conditions (e.g., traffic conditions, weather conditions, etc.), etc. Examples of methods for setting a schedule are described in U.S. patent application Ser. Nos. 16/051,328 and 15/449,660, the entire contents of which are hereby incorporated by reference.

In some embodiments, each of the at least two robotic refuse containers include, but are not limited to, a chassis, a set of wheels (if mobile for example), a suspension system, a rechargeable battery, an actuator, a control module, a processor, and a refuse container coupled to the chassis. An example of an autonomous refuse container is described in U.S. patent application Ser. No. 16/129,757, the entire contents of which is hereby incorporated by reference. For instance, in some embodiments, the container of the robotic device may be used for storing and/or transporting refuse. In some instances, the robotic device may be stored in at least one specific location and refuse may be deposited into the container by, for example, a user or another robotic device. In some embodiments, the refuse within the container is collected from at least one predetermined refuse collection location at least one predetermined date and time that may or may not be recurring on a, for example, weekly or bi-weekly basis. For example, at corporate establishments and/or consumer homes refuse contained within a refuse container is often collected on a recurring weekly or bi-weekly basis. In some embodiments, the robotic device will autonomously transport the refuse contained within the refuse container of the robotic device to a predetermined refuse collection location at a predetermined date and time for refuse collection. After collection of the refuse, the robotic device may autonomously navigate back to a designated storage location. In some embodiments, scheduling information for refuse collection may be provided to the processor of the robotic device using a mobile communication device with graphical user interface, remote control, a user interface on the robotic device, or another type of device that may communicate with the processor of the robotic device. For example, a graphical user interface such as that described in U.S. patents application Ser. Nos. 15/272,752, 62/631,050, and 62/661,802, the entirety of which are hereby incorporated by reference, may be used for entering scheduling information. Further, an example of a method for providing scheduling information to a robotic device is described in U.S. patent application Ser. No. 16/051,328, the entirety of which are hereby incorporated by reference. In some embodiments, a user may choose or modify a path of the robotic device using, for example, an application of a communications device.

In some embodiments, the robotic device may display a status of the robotic device on an interface of the robotic device or any other device paired with the robotic device or may send a status of the robotic device to an application of a communication device paired with the robotic device to provide a user with the status of the robotic device. Communication devices may include, but are not limited to, mobile phone, laptop, tablet, desktop computer, and the like. In other embodiments, the status of the robotic device may be communicated using audio or visual. Examples of statuses and/or messages may include, but is not limited to, parked at refuse container storage location, in route to refuse collection location, parked at the refuse collection location, refuse collection complete, refuse collection delayed, refuse collection incomplete, in route to refuse container storage location, stuck, collision with obstruction, damaged, container cleaning required, level of refuse within the refuse container and the like. In some embodiments, the robotic device may comprise sensors that can measure or detect the amount of refuse within the refuse container.

In some embodiments, the robotic device may comprise a mobile robotic platform that may support and autonomously transport static refuse containers supported by the platform back and forth between at least one refuse container storage location to at least one refuse collection location. In some embodiments, the mobile robotic platform may comprise a locking mechanism for the refuse container.

In embodiments, the processor of the robotic device may learn a path, such as a path between a refuse container storage location and a refuse collection location, in a variety of ways. In some embodiments, the robotic device may be taught a path by directing the robotic device along the desired path by physically moving the robotic device or by using a remote control or an application of a communication device paired with the robotic device. Other methods of moving the robotic device along the desired path may also be used. For example, the robotic device may be taught a path between the refuse container storage location and refuse collection location by physically wheeling the robotic device from the storage location, through the environment, to the refuse collection location. In some embodiments path learning may be initiated by, for example, a user pressing a start button on the robotic device or on any other device capable of communicating with the robotic device, voice activation or autonomously upon startup, prior to beginning the process of teaching a path to a processor of the robotic device. In some embodiments, path learning may be completed by, for example, pressing an end button on the robotic device or on any other device capable of communicating with the robotic device, voice activation, or autonomously upon detecting no movement of the robotic device. Path learning may be initiated when the robotic device is positioned at a storage location of the refuse container and completed after the robotic device has navigated along the desired path and returned back to the storage location or any other storage location. In some embodiments, path learning may be initiated when the robotic device is positioned at a storage location of the refuse container and completed after the robotic device has navigated along the desired path to a refuse collection location. Alternatively, in some embodiments, path learning may be initiated and completed using an application of a communication device, such as a mobile device, laptop or smart phone, capable of communicating with the robotic device. In some embodiments, an application of a communication device may be used to mark a path of the robotic device within a map of the working environment that may be shared with the robotic device. During path learning, the processor of the robotic device may determine its location within an internal map of the working environment while simultaneously mapping the environment. In some instance, the processor of the robotic device may mark observed obstacles in the working environment within an internal map of the environment.

In some embodiments, a memory of the robotic device may contain an internal database of obstacles likely to be encountered within the working environment. In embodiments, an obstacle encountered in the work environment may be identified using various sensors to capture features of the obstacle and the processor to determine the type of obstacle based on the internal database. The processor of the robotic device may note the increased likelihood of that type of obstacle being located in the region of the environment in which it was encountered. For example, if a robotic device encounters a hose on the ground, image sensors of the robotic device may capture features of the hose and the processor may determine it is a hose based on an internal database of obstacles and their features. The processor of the robotic device may mark the region in which the hose was encountered within an internal map as a region with increased likelihood of containing a hose. In some embodiments, the processor may further determine if an obstacle may be overcome by the robotic device. For example, the processor may determine if the hose is an obstacle that may be overcome by the robotic device by driving over the hose. If so, the robotic device may attempt to drive over the obstacle. If, however, the robotic device encounters a large obstacle, such as a planter, the processor may determine that it cannot overcome the obstacle and may attempt to maneuver around the obstacle. In some embodiments, regions wherein obstacles are consistently encountered may be classified by the processor of the robotic device as a high traffic area and may be marked in a map of the environment. In some embodiments, the processor of the robotic device may attempt to alter its path in order to avoid high traffic areas.

In some embodiments, the container and the chassis of the robotic device may be two separate components. In some embodiments, the chassis of the robotic device may comprise a multipurpose transportation platform device that may support and transport various types of objects, including refuse containers. In some embodiments, the chassis may further comprise a locking mechanism for locking an object to be transported to the platform such that it remains static during transportation. In some embodiments, the chassis and refuse container may connected such that the refuse container may be locked into the chassis. In some embodiments, the refuse container may comprise internal and/or external sensors that when connected with the chassis are provided with electrical power. The processor of the robotic device may use the information gathered by the sensors of the refuse container for operating in the working environment or optimization purposes.

In some embodiments, the chassis is a versatile mobile robotic chassis customized to function as a robotic refuse container. An example of a customizable versatile mobile robotic chassis is described in U.S. patent application Ser. No. 16/230,805, the entire contents of which is hereby incorporated by reference. Examples of wheels of a robotic device are described in U.S. Patent Application No. 62/664,389, Ser. Nos. 15/447,450, 15/447,623, and 62/665,942, the entire contents of which are hereby incorporated by reference. Examples of a suspension system are described in U.S. Patent Application Nos. 62/617,589, 62/620,352, and Ser. No. 15/951,096, the entire contents of which are hereby incorporated by reference. In some embodiments, each of the at least two robotic refuse containers further include a user interface for, for example, adjusting settings, choosing functions, and scheduling tasks. In some embodiments, each of the at least two robotic refuse containers further include a mapping module for mapping the environment using mapping methods such as those described in U.S. patents application Ser. Nos. 16/048,179, 16/048,185, 16/163,541, 16/163,562, 16/163,508, 16/185,000, 62/681,965, and 62/614,449, the entire contents of which are hereby incorporated by reference. In some embodiments, each of the at least two robotic refuse containers further include a localization module that implement localization methods such as those described in U.S. Patent Application Nos. 62/746,688, 62/740,573, 62/740,580, Ser. Nos. 15/955,480, 15/425,130, and 15/955,344 the entire contents of which are hereby incorporated by reference. In some embodiments, each of the at least two robotic refuse containers further include a path planning module to determine optimal movement paths based on the actions to be executed using path planning methods such as those described in U.S. patent application Ser. Nos. 16/041,286, 15/406,890, and 14/673,633, the entire contents of which are hereby incorporated by reference. In some embodiments, each of the at least two robotic refuse containers include a scheduling module for setting a schedule using scheduling methods such as those described in U.S. patent application Ser. Nos. 16/051,328 and 15/449,660, the entire contents of which are hereby incorporated by reference. In some embodiments, each of the at least two robotic refuse containers include sensors such as battery level sensors, weight sensors, refuse volume sensors, cameras, LIDAR sensors, LADAR sensors, stereo imaging sensors, optical sensors, imaging sensors, distance sensors, acoustic sensors, motion sensors, obstacle sensors, cliff sensors, floor sensors, debris sensors, time-of-flight sensors, depth sensors, signal transmitters and receivers, signal strength sensor, gyroscope, optical encoders, optical flow sensors, GPS sensors, and other types of sensors. In some embodiments, each of the at least two robotic refuse containers include a wireless module to wirelessly send and receive information, such as a Wi-Fi module or a Bluetooth module.

FIG. 1 illustrates a flow chart including steps 100, 101, 102, 103, and 104 that describe some embodiments of a method for managing autonomous refuse container replacement of at least two robotic refuse containers described herein.

Figure 2:
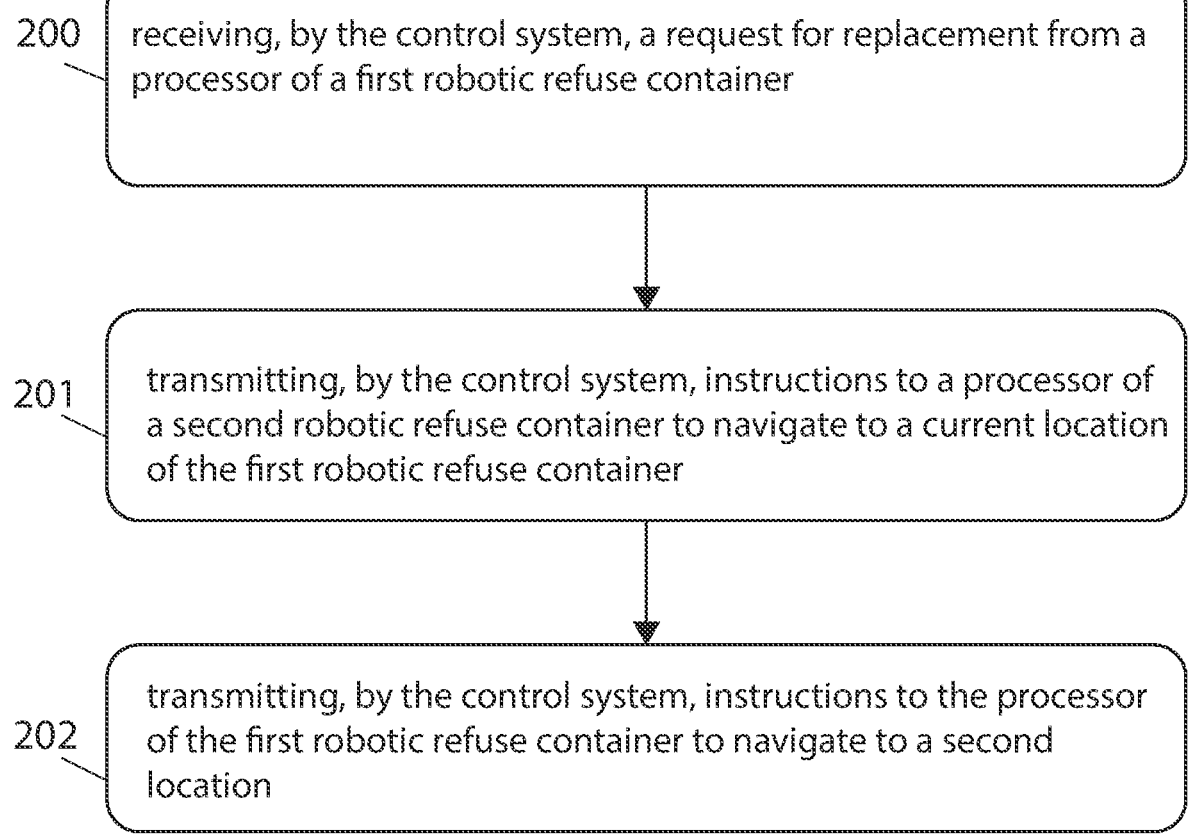
FIG. 2 illustrates a flow chart describing a method for autonomous refuse container replacement according to some embodiments.

FIG. 2 illustrates a flow chart including steps 200, 201, and 202 that describe some embodiments of a method for a control system to manage autonomous refuse container replacement of at least two robotic refuse containers described herein.

Figure 3:
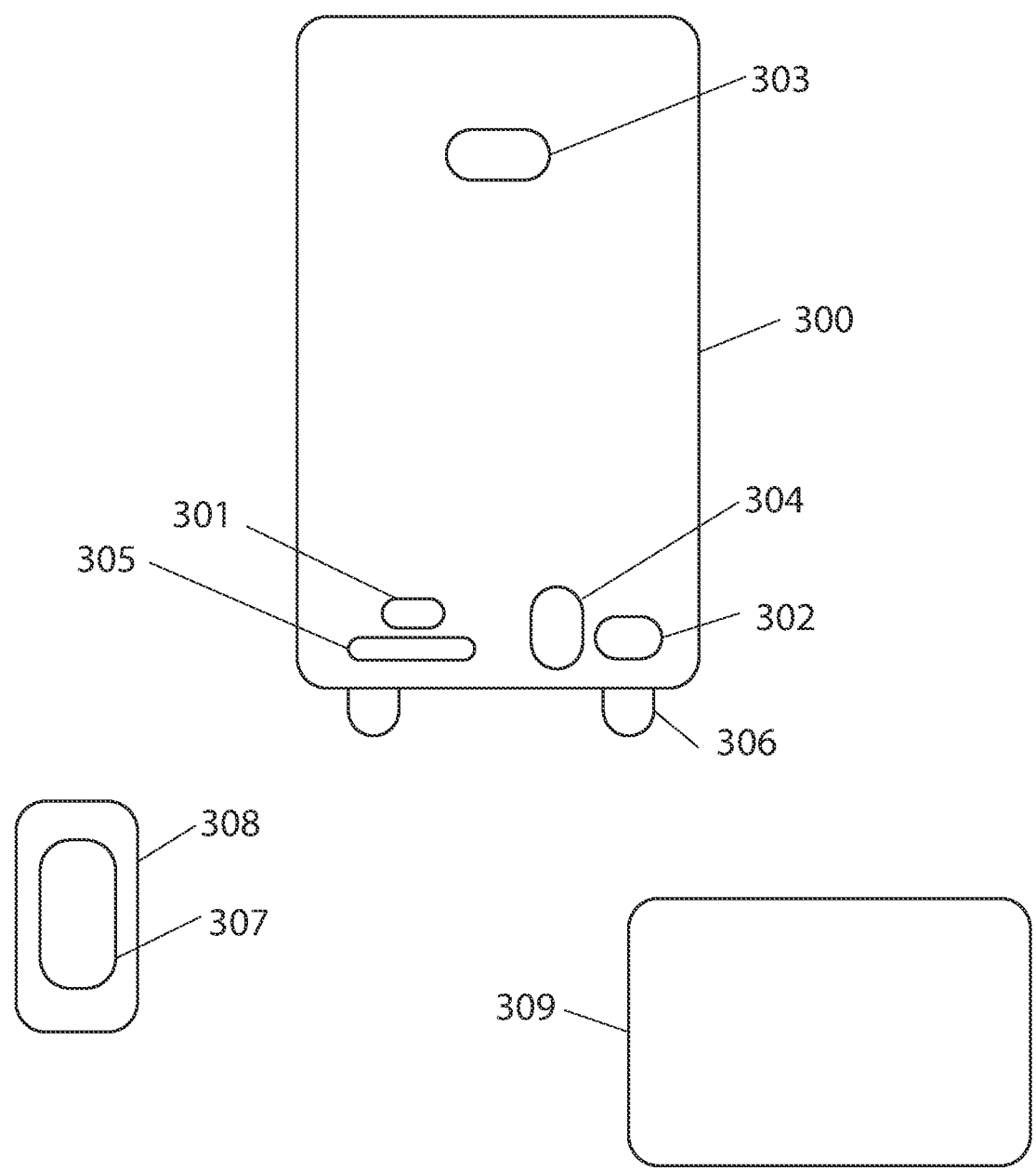
FIG. 3 illustrates an example of a robotic refuse container, an application of a communication device, and a control system according to some embodiments.

FIG. 3 illustrates a front view of an example of a robotic refuse container 300 with a processor 301, memory 302, sensors 303, actuator 304, battery 305 and wheels 306. In some embodiments, the robotic refuse container 300 may include the features of a robotic refuse container described herein. In some embodiments, program code stored in the memory 302 and executed by the processor 301 may effectuate the operations described herein. Some embodiments additionally include communication device 307 (e.g., mobile device, laptop, remote control, specialized computer, desktop computer, tablet, etc.) having a touchscreen 308 and that executes an application by which a user or operator interfaces with robotic refuse container 300. In some embodiments, processor 301 and memory 302 implement some of the functionality described herein. In some embodiments, the user or operator may provide instructions to robotic refuse container 300 to perform certain tasks or to use certain settings at certain times or in certain areas of the environment using the application of communication device 307 wirelessly paired with robotic refuse container 300 or control system 309 managing robotic refuse container 300.

Various embodiments are described herein below, including methods and techniques. It should be kept in mind that the invention might also cover articles of manufacture that include a computer-readable medium on which computer-readable instructions for carrying out embodiments of the inventive technique are stored. The computer-readable medium may include semiconductor, magnetic, opto-magnetic, optical, or other forms of computer-readable medium for storing computer-readable code. Further, the invention may also cover apparatuses for practicing embodiments of the invention. Such apparatus may include circuits, dedicated and/or programmable, to carry out tasks pertaining to embodiments of the invention. Examples of such apparatus include a computer and/or a dedicated computing device when appropriately programmed and may include a combination of a computer/computing device and dedicated/programmable circuits adapted for the various tasks pertaining to embodiments of the invention.

In block diagrams provided herein, illustrated components are depicted as discrete functional blocks, but embodiments are not limited to systems in which the functionality described herein is organized as illustrated. The functionality provided by each of the components may be provided by software or hardware modules that are differently organized than is presently depicted. For example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A robotic refuse container system, comprising:
   a first robotic refuse container, comprising:
      a chassis;
      a set of wheels;
      a rechargeable battery;
      a processor;
      a refuse container coupled to the chassis;
      a plurality of sensors; and
      a tangible, non-transitory, machine-readable medium storing instructions that when executed by the processor effectuates operations comprising:
         collecting, by the plurality of sensors, sensor data;
         determining, by the processor, a movement path of the first robotic refuse container from a first location to a second location;
         transmitting, by the processor of a first robotic refuse container, a request for replacement to a processor of at least one robotic refuse container;
         receiving, by the processor of the first robotic refuse container, a return signal from the processor of the at least one robotic refuse container that received the request for replacement;
         transmitting, by the processor of the first robotic refuse container, a confirmation for replacement to a processor of a second robotic refuse container in response to a return signal received from the processor of the second robotic refuse container from among all the return signals received; and
         instructing, by the processor of the first robotic refuse container, the first robotic refuse container to navigate to another location from a current location;
   the second robotic refuse container, comprising:
      a chassis;
      a set of wheels;
      a rechargeable battery;
      a processor;
      a refuse container coupled to the chassis;
      a plurality of sensors; and
      a tangible, non-transitory, machine-readable medium storing instructions that when executed by the processor of the second robotic refuse container effectuates operations comprising:
         instructing, by the processor of the second robotic refuse container, the second robotic refuse container to navigate to the current location of the first robotic refuse container; and
   wherein:
      the at least one robotic refuse container that receives the request for replacement is within a first predetermined distance from the first robotic refuse container;
      the processor of the at least one robotic refuse container effectuates operations comprising:
         capturing, by a first sensor of the at least one robotic refuse container, sensor data indicative of a battery level of the second robotic refuse container; and
         capturing, by a second sensor of the at least one robotic refuse container, sensor data indicative of a refuse container fill volume of the refuse container of the second robotic refuse container;
      the at least one robotic refuse container that transmits the return signal has the battery level above a predetermined threshold and a refuse container fill volume less than a predetermined threshold.

2. The system of claim 1, wherein:
   a user physically moves the first robotic refuse container from the first location to the second location; and
   the processor of the first robotic refuse container determines the movement path of the first robotic refuse based on sensor data collected during the physical movement of the first robotic refuse container from the first location to the second location.

3. The system of claim 2, wherein the schedule comprises a day, a time, and a frequency of refuse collection.

4. The system of claim 1, wherein the first location is a storage location of the first robotic refuse container.

5. The system of claim 1, wherein the processor of the first robotic refuse container effectuates operations further comprising:
  capturing, by the first sensor of the first robotic refuse container, sensor data indicative of the battery level of the first robotic refuse container;
  capturing, by a second sensor of the first robotic refuse container, sensor data indicative of a refuse container fill volume of the refuse container of the first robotic refuse container;
  wherein the processor of the first robotic refuse container requests replacement because the battery level of the first robotic refuse container is below a predetermined threshold, a refuse container fill volume of the refuse container of the first robotic refuse container is greater than a predetermined threshold, or the first robotic refuse container is malfunctioning.

6. The system of claim 1, wherein the processor of the first robotic refuse container increases the first predetermined distance to a second predetermined distance when the processor of the first robotic refuse container does not receive any return signals.

7. The system of claim 1, wherein the second location of the first robotic refuse container is a nearest charging station, a nearest refuse collection site, a nearest parking area, a designated charging station, a designated refuse collection site, or a designated parking area.

8. The system of claim 1, wherein the processor of the at least one robotic refuse container transmits and receives information to and from the processor of the first robotic refuse container.

9. The system of claim 8, wherein the information comprises at least one of: a current location, a current refuse container fill volume determined based on sensor data indicative of a refuse container fill volume, a battery level determined based on sensor data indicative of a battery level, a surrounding activity level, a number of operation hours, a robotic refuse container condition, a status, a number of maintenance hours, a time required to reach a replacement location, environmental conditions, historical success in completing actions, actions executed, upcoming actions, and sensor data.

10. The system of claim 9, wherein the action comprises at least one of: an instruction to execute a schedule of the first robotic refuse container, an instruction to navigate to a particular location, and an instruction to execute a movement path.

11. The system of claim 1, wherein the processor of the first robotic refuse container effectuates operations further comprising:
  pairing, by the processor of the first robotic refuse container, the first robotic device with an application of a communication device.

12. The system of claim 1, wherein the first robotic refuse container remains parked at the first location until receiving an instruction to execute a particular action.

13. A method for managing an autonomous robotic refuse container system comprising:
  collecting, by a plurality of sensors disposed on a first robotic refuse container, sensor data;
  determining, by a processor of the first robotic refuse container, a movement path of the first robotic refuse container from a first location to a second location;
  transmitting, by the processor of a first robotic refuse container, a request for replacement to a processor of at least one robotic refuse container;
  receiving, by the processor of the first robotic refuse container, a return signal from the processor of the at least one robotic refuse container that received the request for replacement;
  transmitting, by the processor of the first robotic refuse container, a confirmation for replacement to a processor of a second robotic refuse container in response to a return signal received from the processor of the second robotic refuse container from among all the return signals received; and
  instructing, by the processor of the first robotic refuse container, the first robotic refuse container to navigate to another location from a current location;
  instructing, by the processor of the second robotic refuse container, the second robotic refuse container to navigate to the current location of the first robotic refuse container;
  wherein:
    the processor of the at least one robotic refuse container effectuates operations comprising:
      capturing, by a first sensor of the at least one robotic refuse container, sensor data indicative of a battery level of the second robotic refuse container; and
      capturing, by a second sensor of the at least one robotic refuse container, sensor data indicative of a refuse container fill volume of the refuse container of the second robotic refuse container;
    the at least one robotic refuse container that transmits the return signal has the battery level above a predetermined threshold and a refuse container fill volume less than a predetermined threshold; and
    the processor of the first robotic refuse container increases the first predetermined distance to a second predetermined distance when the processor of the first robotic refuse container does not receive any return signals.

14. The method of claim 13, wherein the movement path of the first robotic refuse container is determined based on sensor data collected during physical movement of the first robotic refuse container by a user from the first location to the second location.

15. The method of claim 13, wherein:
  the first location is a storage location of the first robotic refuse container.

16. The method of claim 13, further comprising:
  pairing, by the processor of the first robotic refuse container, the first robotic device with an application of a communication device.

17. The method of claim 16, further comprising:
  receiving, by the application, at least one input designating at least a schedule of the first robotic refuse container, an instruction to navigate the first robotic refuse container to a particular location, and a second movement path of the first robotic refuse container from a third location to a fourth location; and
  displaying, by the application, a status of the first robotic refuse container.

18. The method of claim 13, wherein the first robotic refuse container remains parked at the first location until receiving an instruction to execute a particular action.

19. The method of claim 18, wherein the action comprises at least one of: an instruction to execute a schedule of the first robotic refuse container, an instruction to navigate to a particular location, and an instruction to execute a movement path.

20. The system of claim 11, further comprising the application of the communication device, configured to:
- receive at least one input designating at least a schedule of the first robotic refuse container, an instruction to navigate the first robotic refuse container to a particular location, and a second movement path of the first robotic refuse container from a third location to a fourth location; and
- display a status of the first robotic refuse container.

\* \* \* \* \*